United States Patent
Wengrovitz et al.

(10) Patent No.: US 8,773,532 B2
(45) Date of Patent: Jul. 8, 2014

(54) VIDEO SURVEILLANCE SYSTEM INTEGRATING REAL AND LOGICAL VIDEO STREAMS

(75) Inventors: Michael S. Wengrovitz, Concord, MA (US); Tom Janiszewski, Andover, NJ (US)

(73) Assignee: Alcatel Lucent, Paris (FR)

( * ) Notice: Subject to any disclaimer, the term of this patent is extended or adjusted under 35 U.S.C. 154(b) by 585 days.

(21) Appl. No.: 13/159,018

(22) Filed: Jun. 13, 2011

(65) Prior Publication Data
US 2012/0314018 A1    Dec. 13, 2012

(51) Int. Cl.
*H04N 7/18*    (2006.01)

(52) U.S. Cl.
USPC .......................................................... 348/143

(58) Field of Classification Search
CPC .............. H04N 7/181; H04N 21/2381; H04N 21/44209; H04N 21/631; H04N 21/6437; H04N 21/64792; G06F 17/3079; G06F 17/30843; G06F 17/30811; G06F 17/30817; G06F 17/3082; G06F 17/30834
See application file for complete search history.

(56) References Cited

U.S. PATENT DOCUMENTS

| | | | | |
|---|---|---|---|---|
| 7,460,149 | B1* | 12/2008 | Donovan et al. | 348/143 |
| 8,270,425 | B2* | 9/2012 | Poola et al. | 370/432 |
| 8,311,277 | B2* | 11/2012 | Peleg et al. | 382/103 |
| 2006/0088092 | A1* | 4/2006 | Chen et al. | 375/240.01 |
| 2010/0092037 | A1* | 4/2010 | Peleg et al. | 382/103 |
| 2011/0158146 | A1* | 6/2011 | Poola et al. | 370/312 |
| 2013/0027551 | A1* | 1/2013 | Peleg et al. | 348/143 |

* cited by examiner

*Primary Examiner* — Mohammad Islam
(74) *Attorney, Agent, or Firm* — Garlick & Markison (57) ABSTRACT

A camera emulation server enables integration of real and logical digital video streams within a video surveillance system. The camera emulation server produces a logical digital video stream emulating a real video surveillance camera, in which the logical digital video stream includes data other than original video surveillance data. The camera emulation server provides the logical digital video stream to a video management server via a packet-switched network for integration with a real digital video stream that includes video surveillance data captured by a remote physical video surveillance camera. The video management server routes the logical digital video stream and the real digital video stream to a video receiving device for simultaneous display in respective window panes configured in a tiled format on at least one display device of the video receiving device.

20 Claims, 6 Drawing Sheets

VIDEO SURVEILLANCE SYSTEM INTEGRATING REAL AND LOGICAL VIDEO STREAMS

BACKGROUND OF THE INVENTION

1. Technical Field of the Invention

The present invention relates in general to video surveillance systems, and in particular, to integrating real digital video streams from video surveillance cameras and logical digital video streams from other sources.

2. Description of Related Art

Video surveillance systems with cameras streaming standard and high-definition video over IP networks to digital recorders, video analytics systems, video management displays and other observing devices/systems are becoming commonplace in the market. Camera network system s can found in airports, on city streets, in transportation facilities, in public shopping malls, iii retail establishment chains, and elsewhere. The features of such systems enhance protection of people, assets and property. Small, medium and large camera networks currently exist with multiple observers remotely located anywhere on locally connected or wide area networks.

The typical video surveillance system is based on a single centralized server, or multiple distributed servers, running video management software that connects with many cameras which can be observed by multiple observers. Each observer uses a browser-based or a standalone viewing application to view and to interact with multiple camera streams displayed in a tiled format. The observer may also use a graphical user interface (GUI) to manually operate Pan/Tilt/Zoom (PTZ) controls of various cameras in the tiled view, to trigger or invoke PTZ presets, and in some cases to listen and push-to-talk to microphones and speakers connected to cameras.

Typically, the IP-based protocol between the observers and the video management server is private and specific to the manufacturer. The control and streaming protocol between the video management server and the cameras is typically also specific to each camera manufacturer, although open-standards for IP camera streaming and control are emerging. Multiple types of IP cameras may also exist in a single system, and in this case the video management server may be configured to use the camera vendor-specific protocol for communicating with each type of camera.

In addition to the streams from actual video surveillance cameras, there has been a recent interest in enabling end users to observe and control various types of streams from other sources without requiring any changes to existing (legacy) video management servers and displays. For example, it may be desirable for observers to use their existing video management GUIs to view and/or participate in multi-party video teleconferences for improved communication and collaboration. However, the different protocols used by cameras and video management systems have made it difficult to integrate streams from other sources into a video management system. Therefore, what is needed is a system capable of integrating both real video streams from video surveillance cameras and logical video streams from other sources.

SUMMARY OF THE INVENTION

A video surveillance system, in one embodiment, includes a camera emulation server and a video management server. The camera emulation server produces a logical digital video stream emulating a real video surveillance camera, in which the logical digital video stream includes data other than original video surveillance data. The video management server is coupled to the camera emulation server via a packet-switched network to receive the logical digital video stream and further coupled to the packet-switched network to receive a real digital video stream including video surveillance data captured by a remote physical video surveillance camera. The video management server provides the logical digital video stream and the real digital video stream to a video receiving device via the packet-switched network for simultaneous display in respective panes configured in a tiled format on a screen of the video receiving device.

In an exemplary embodiment, the video management server further provides a graphical user interface to the video receiving device to enable a user to control the logical digital video stream and the real digital video stream. In one embodiment, the graphical user interface enables the user to enter a camera control command on the video receiving device that is provided to the camera emulation server via the video management server. The camera emulation server maps the camera control command to an application program interface (API) command for the logical digital video stream.

In another exemplary embodiment, the logical digital video stream includes one or more of a processed digital video stream of an additional remote physical video surveillance camera, a static digital file, a dynamic digital file, an application, a website, a communication session, streaming media and a digital presentation including one or more of text, graphics, sound, animated objects and multimedia objects.

In a further exemplary embodiment, the camera emulation server communicates with the video management server by emulating a protocol of an IP video surveillance camera or using one of: a specific protocol defined by the video management server, a standard protocol or a generic protocol.

In still a further exemplary embodiment, the camera emulation server further emulates a video encoder to provide multiple logical digital video streams from a single IP address and port to the video management server. In another exemplary embodiment, the camera emulation server includes at least one of multiple IP addresses and multiple ports to provide multiple logical digital video streams to the video management server.

In yet another exemplary embodiment, the video surveillance system further includes a video processing system. The video processing system includes the camera emulation server and one or more chains of pipelined modules coupled to the camera emulation server, in which the pipelined modules enable the camera emulation server to provide the logical digital video stream to the video management server.

In another embodiment of the invention, a camera emulation server is provided. The camera emulation server includes a network interface coupled to a packet-based network and a processor for producing a logical digital video stream emulating a real video surveillance camera, in which the logical digital video stream includes data other than original video surveillance data. The processor further transmits the logical digital video stream to a video management server via the network interface for routing of the logical digital video stream to a video receiving device for display thereon in combination with a real digital video stream including video surveillance data captured by a remote physical video surveillance camera in respective panes configured in a tiled format on a screen of the video receiving device.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, a camera emulation server is provided that emulates a physical video surveillance camera to provide logical digital video streams to video receiving devices. Some examples of logical digital video streams include: a communication session, such as a voice/video teleconference; a processed real digital video stream, such as a video stream from a video surveillance camera that is overlayed with real-time data measurements (i.e., a camera in a nuclear reactor with real-time data from a temperature, radiation or biologic sensor), a video stream from a video surveillance camera that is overlayed with icons marking and tracking objects of interest or a video stream from a video surveillance camera that includes any other processing-enhanced video features; a web conference (i.e., whiteboard and/or desktop screen sharing); a static or dynamic digital file, such as a static or dynamic geographical map; a graphical user interface of an external software application; a web page of a website; a digital presentation including one or more of text, graphics, sound, animated objects and multimedia objects; and real-time or non-real-time streaming media (i.e., a broadcast television/radio program, a movie or other media presentation).

Figure 1:
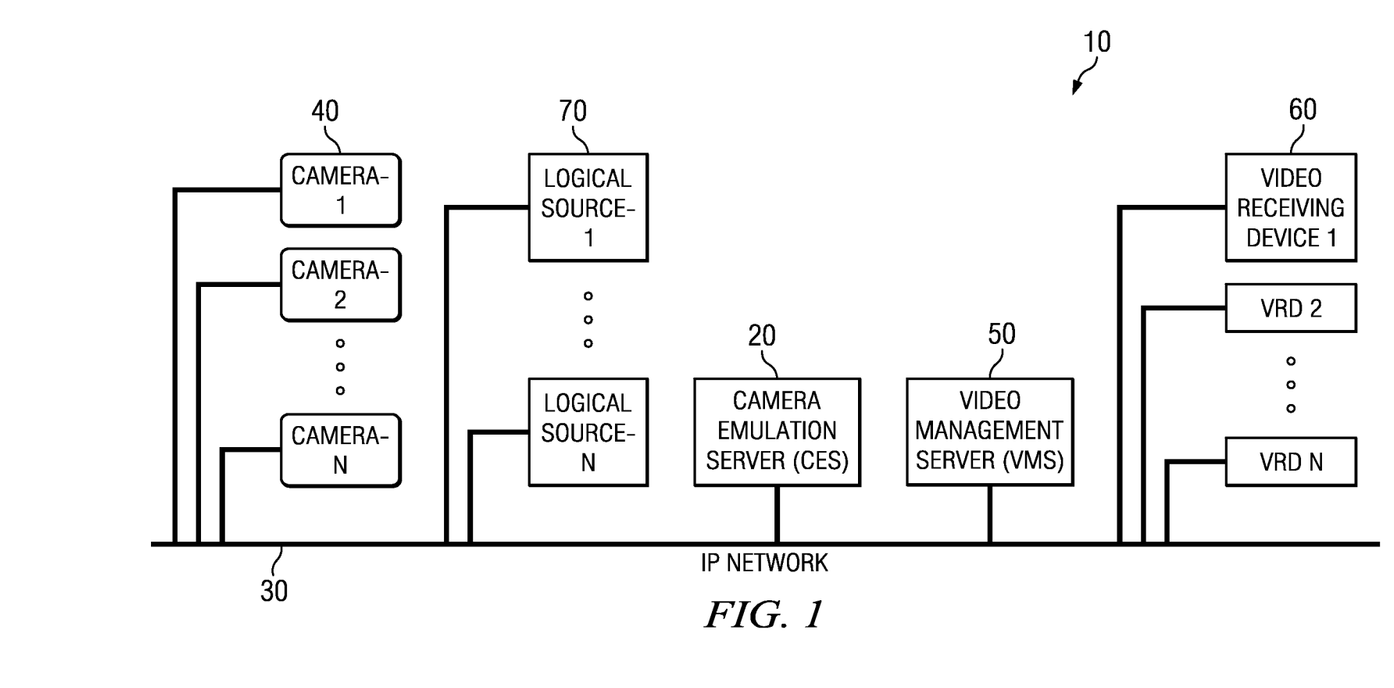
FIG. 1 illustrates an exemplary video surveillance system for integrating real and logical digital video streams, in accordance with embodiments of the present invention.

FIG. 1 illustrates an exemplary video surveillance system 10 for integrating real digital video streams captured by remote video surveillance cameras 40 and logical digital video streams from logical sources 70 and providing the real and logical digital video streams to one or more video receiving devices 60, in accordance with embodiments of the present invention. The system 10 includes the remote video surveillance cameras (Camera-1, Camera-2 . . . Camera-N) 40, the logical sources (Logical Source-1 . . . Logical Source-N) 70, the video receiving devices (VRD-1, VRD-2 . . . VRD-N) 50, a Video Management Server (VMS) 50 and a Camera Emulation Server (CES) 20. The CES 20, VMS 50, cameras 40, logical sources 70 and video receiving devices (VRDs) 60 communicate through a packet-switched network 30, such as an Internet Protocol (IP) network or other type of packet-based network.

By way of example, but not limitation, the video receiving devices 60 may be additional VMS's, networked video recorders, video analytic systems, surveillance video routers, browsers or display devices. Examples of display devices include devices having a single display, such as a mobile communication device, smartphone or tablet, a personal computer, a laptop computer or a security system display device, or devices having multiple displays, such as a security system video wall. Although multiple VRDs 60 are shown, in other embodiments, the VMS 50 may be incorporated as part of a particular VRD 60.

The VMS 50 receives and provides real digital video streams, including original video surveillance data captured by the remote physical video surveillance cameras 40, in real-time to one or more of the VRDs 60 for display thereon. As used herein, the term "original video surveillance data" refers to the video data that is output from a video surveillance camera 40, and may include raw video surveillance data or processed video surveillance data that is processed by the remote video surveillance camera 40 prior to transmission to the VMS 50. In addition, the VMS 50 receives logical digital video streams, including data other than original video surveillance data, from the CES 20 and provides the logical digital video streams to one or more of the VRDs 60 for display thereon. The VMS 50 may route real or logical digital video streams to VRDs 60 based on internal instructions or on request. The request can be initiated by the VRD 60 or by external third party control.

For example, in one embodiment, the VRDs 60 can establish respective signaling connections with the VMS 50 and request to receive the real or logical digital video stream(s) from one or more cameras 40 or logical sources 70. The VMS 50, in turn, can set-up separate media sessions with one or more cameras 40 to receive the real digital video streams from the cameras 40 and separate media sessions with one or more logical sources 70 and/or cameras 40 to receive or produce the logical digital video streams, as will be described in more detail below. The VMS 50 can establish the media sessions prior to or as a result of receiving the request. Either way, upon receiving the request, the VMS 50 routes the requested real or logical digital video streams to the VRDs 60.

In another embodiment, the VMS 50 can receive a request from a third party source to suitably route the real or logical digital video stream(s) to one or more VRDs 60. In this embodiment, the VMS 50 can also establish the signaling connections with the cameras 40 or logical sources 70 prior to or as a result of receiving the request and route the requested real or logical digital video streams to the appropriate VRDs 60.

The VMS 50 can also implement both unicast and multicast IP distribution schemes. For example, some cameras 40 or logical sources 70 could be switched/routed using unicast, whereas others could be switched/routed using multicast to distribute the real or logical digital video streams to multiple VRDs 60. In other embodiments, the VMS 50 may also be able to receive multicast streams and route the multicast streams as unicast or multicast streams to one or more VRDs 60.

To provide the logical digital video streams to the VMS 50, the CES 20 emulates one or more real video surveillance cameras. For example, in one embodiment, the VMS 50 is unaware that it is communicating with the CES 20 and not an actual physical video surveillance camera. In a further embodiment, the VRD 60 is also unaware that it is involved in a video session with a logical video surveillance camera, not a real camera.

In an exemplary embodiment, the CES 20 receives the logical digital video streams from one or more logical sources 70. By way of example, but not limitation, the logical sources 70 may include a teleconference server providing voice and/or video teleconferencing, a web conference server providing web conferencing, a voice over IP (VoIP) server providing voice and/or video over IP, a web server providing web pages of a website, an instant message server providing instant messaging service, an email server providing email service, a remote sensor providing sensor data or a remote server/computer providing various media. As such, the logical digital video streams may include, but are not limited to, streaming media, a graphical user interface of a software application accessed as a client by the CES 20, a static or dynamic digital file, a digital presentation including one or more of text, graphics, sound, animated objects and multimedia objects, a web page of a website or a communication session, such as a voice conference, video conference, web conference (i.e., whiteboard or desktop sharing), voice over Internet Protocol (VoIP) call, video call, or instant messaging session.

In another exemplary embodiment, the CES 20 receives real digital video streams from one or more cameras 40 and processes the real digital video streams to produce the logical digital video streams. In this embodiment, the CES 20 acts as a fully programmable and customizable man-in-the-middle processor in-between one or more physical cameras 40 and the VMS 50. For example, the CES 20 may add an overlay of text and/or graphics to the real digital video stream to produce the logical digital video stream (i.e., the CES 20 may overlay the digital video stream produced from a camera in a nuclear reactor with real-time data from a temperature, radiation or biologic sensor, or the CES 20 may overlay the digital video stream produced from a security camera with icons marking and tracking objects of interest). As another example, the CES 20 may process the real digital video stream using advanced-replay, slow motion, auto-zoom and/or other processing-enhanced video features to produce the logical digital video stream.

In yet another exemplary embodiment, the CES 20 may further provide one or more real digital video streams from one or more cameras 40 to the VMS 50. In this embodiment, the CES 20 acts as a proxy between the cameras 40 and the VMS 50 and the output from the CES 20 is not a logical digital video stream, but rather a real digital video stream. The CES 20 may also provide one or more logical digital video streams to the VMS 50 in addition to the one or more real digital video streams.

As described above, video receiving devices 60 (e.g., VRD 1, VRD 2 . . . VRD N) may include, for example, devices having a single display, such as a mobile communication device, smartphone or tablet, a personal computer, a laptop computer or a security system display device, or devices having multiple displays, such as a security system video wall. Each VRD 60 may be operated by an observer viewing one or more real/logical digital video streams.

In an exemplary embodiment, each VRD 60 includes at least one display device having at least one screen on which the real and logical digital video streams may be displayed. To view multiple real/logical digital video streams simultaneously, the real/logical digital video streams can be displayed in a tiled format configuration such that each real/logical digital video stream is displayed in a respective window pane on the screen(s) of the display device(s) of the VRD 60, as will be described in more detail below in connection with FIG. 5.

Figure 2:
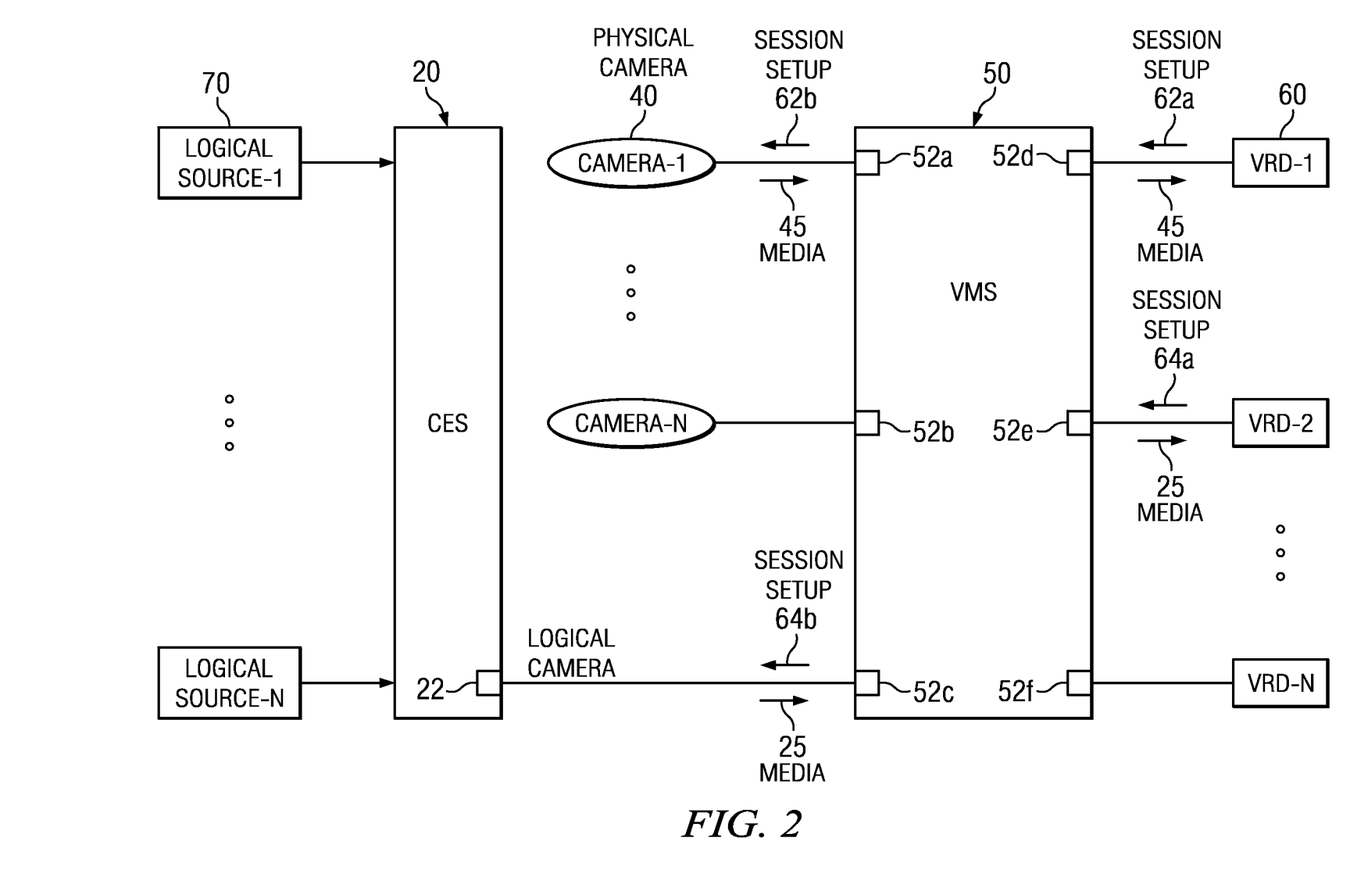
FIG. 2 illustrates an exemplary configuration of the video surveillance system to, in accordance with embodiments of the present invention.

Turning now to FIG. 2, in an exemplary embodiment, in order for an observer of a particular VRD 60 (e.g., VRD-1) to view the real digital video stream from a particular camera 40 (e.g., Camera-1), VRD-1 sets up a video session with the VMS 50 using appropriate Session Setup signaling 62a. For example, VRD-1 can issue a Session Setup Signaling HTTP request 62a to the VMS's IP address at port 52d of the VMS 50. The Session Setup Signaling request can include, for example, the URL of Camera-1.

In response to receiving the Session Setup signaling 62a from VRD-1, the VMS 50 initiates a session with Camera-1. For example, the VMS 50 can issue a Session Setup Signaling HTTP (Hyper Text Transfer Protocol) request 62b from the VMS IP address and port 52a to Camera-1. Media 45 (e.g., a real digital video stream) from Camera-1 is returned to the VMS 50 at port 52a within an HTTP response, which routes the real digital video stream 45 (e.g., within the HTTP response) to VRD-1 via port 52d. For example, the real digital video stream 45 can be sent as Real Time Streaming Protocol (RTSP) over Real Time Protocol (RTP) packets or as a series of Motion Joint Photographic Experts Group (MJPEG) or H264 frames.

In another exemplary embodiment, in order for an observer of a particular VRD 60 (e.g., VRD-2) to view a particular logical digital video stream from the CES 20, VRD-2 sets up a session with the VMS 50 using appropriate Session Setup signaling 64a. For example, VRD-2 can issue a Session Setup Signaling HTTP request 64a to the VMS's IP address at port 52e of the VMS 50. The Session Setup Signaling request 64a can include, for example, the URL of a particular logical digital video stream. The URL can reference, for example, a web page of a website, a document/file or a physical camera. As another example, the Session Setup Signaling request 64a can include communication information for use in establishing a communication session, such as a voice/video call. Such communication information can include, but is not limited to, IP addresses, telephone numbers, other contact information and various types of messages, such as Session Initiation Protocol (SIP) messages and other messages for use in establishing communication sessions.

In response to receiving the Session Setup signaling 64a from VRD-2, the VMS 50 initiates a session with CES 20. For example, the VMS 50 can issue a Session Setup Signaling HTTP (Hyper Text Transfer Protocol) request 64b from the VMS IP address and port 52c to the IP address and port 22 of CES 20. The CES 20, in turn, retrieves the requested media 25 (e.g., logical digital video stream) from one or more logical sources 70 and provides the logical digital video stream 25 to the VMS 50, which routes the logical digital video stream 25 to VRD-2.

It should be noted that the term "port" is merely illustrative, and many other types of logical implementations are possible using various stream identification mechanisms, such as tuples, source/destination specification IDs, etc.

Different VRDs 60 may setup sessions with the VMS 50 using different Session Setup Signaling protocols. For example, a VRD manufactured by Vendor 1 may use one type of Session Setup Signaling protocol and syntax, whereas a VRD manufactured by Vendor 2 may use another type of Session Setup Signaling protocol and syntax. Likewise, the VMS 50 may setup sessions with physical cameras 40 and the CES 20 using different Session Setup Signaling protocols. In addition, the CES 20 may setup sessions with logical sources 70 and cameras 40 using different Session Setup Signaling protocols. In an exemplary embodiment, the VMS 50 and CES 20 can each accommodate these variations in protocol and syntax.

In addition, various possibilities exist for the type of IP-based protocol that connects the CES 20 to the VMS 50. In an exemplary embodiment, the CES 20 implements multiple such protocols, which can be selectable dependent on configuration, licensing and/or other factors. In one embodiment, the CES 20 communicates with the VMS 50 by emulating the protocol of one or more industry-standard IP video surveillance cameras. For example, the CES 20 may emulate the protocol from one of the market-leading IP camera vendors. In another embodiment, the CES 20 communicates with the VMS 50 using a specific protocol defined by the VMS 50. For example, the CES 20 may use the protocol from a market-leading VMS company. In yet another embodiment, the CES 20 communicates with the VMS 50 using one or more industry standard protocols for communication with IP cameras. In still another embodiment, the CES 20 communicates with the VMS 50 using a generic protocol, such as HTTP and/or MJPEG.

Figure 3:
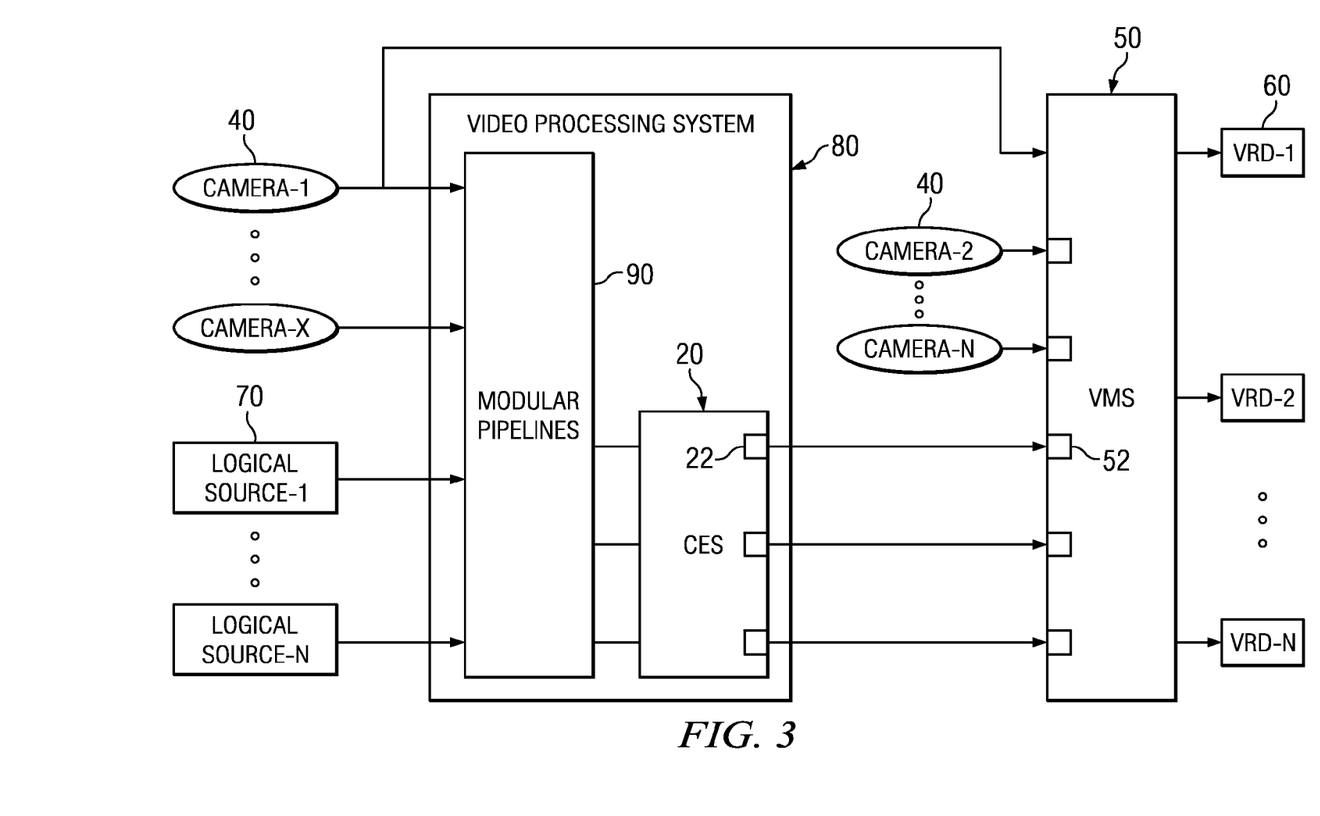
FIG. 3 illustrates another exemplary configuration of the video surveillance system, in accordance with embodiments of the present invention.

FIG. 3 illustrates an exemplary configuration of the video surveillance system, in accordance with embodiments of the present invention. In FIG. 3, the CES 20 is implemented as a module within a video processing system 80. The video processing system 80 is, for example, a software-based system constructed by defining the sequences of interconnections between modules in chains, referred to as pipelines 90, in order to implement an arbitrary audio/video processing system. For example, modules/pipelines 90 may be constructed for video transcoding, tiling, video enhancement, face recognition, gesture recognition, etc.

Inputs to the video processing system 80 include IP-based cameras 40 (Camera-1 . . . Camera-X) and other logical sources 70 (Logical Source-1 . . . Logical Source-N), such as video sources, telephones, VoIP voice/video devices, network routers/servers, multimedia files, PC screens, viewgraph presentations, sensor signal sources, etc. The video processing system 80 is highly-scalable since modules and pipelines 90 can connect to one another via TCP/IP either within a single server, between multiple servers in a rack, or across virtualized servers distributed within cloud-based architectures. In addition, the video processing system 80 may expose various Web-Service-based and other types of control and monitoring APIs that are used to control the various modules/pipelines 90, to monitor events, and to supply interface and processing parameters. The video processing system 80 is highly flexible in that existing modules and new modules can be assembled, reassembled and interconnected in any fashion within the same overall architectural framework.

In addition, instead of the single channel of video and control between the CES 20 and the VMS 50 shown in FIG. 2, in FIG. 3, multiple such channels can be supported by the CES 20. In an exemplary embodiment, the VMS 50 is suitably configured with the IP addresses and ports 22 of the CES 20, and selects a specific IP address/port of the CES 20 from which to receive one or more logical digital video streams for one or more VRDs 60.

For example, the VMS 50 may connect to the CES 20 at IPaddress1:Port1 to receive and control Stream-1, at IPaddress1:Port2 to receive and control Stream-2, and IPaddress1:Port3 to receive Stream-3. In this example, a single IP address and various different ports of the CES 20 are used to designate the streams. As another example, the VMS 50 may connect to the CES 20 at IPaddress1:Port1 to receive and control Stream-1, at IPaddress2:Port1 to receive and control Stream-2, and IPaddress3:Port1 to receive and control Stream-3. In this example, multiple IP addresses and a single port are used to designate the streams. As yet another example, the CES 20 may emulate a video encoder having multiple streams at a single IP address and port.

It should be understood that the VMS 50 can connect to the CES in any of the above examples using one or more IP addresses and ports 52 of the VMS 50. In addition, as described above, the VMS 50 is further able to connect to one or more cameras 40 (Camera-a . . . Camera-N). The cameras 40 connected to the VMS 50 may be the same as and/or different from the cameras 40 connected to the video processing system 80.

Figure 4:
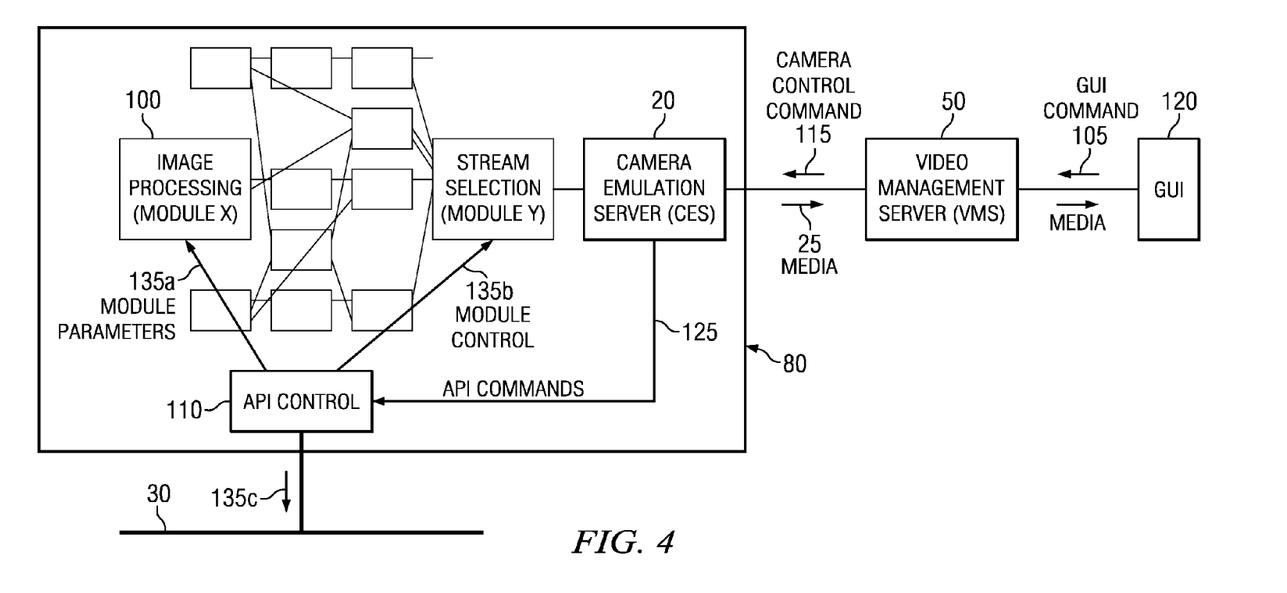
FIG. 4 illustrates yet another exemplary configuration of the video surveillance system, in accordance with embodiments of the present invention.

FIG. 4 illustrates an exemplary embodiment for controlling logical digital video streams 25, in accordance with embodiments of the present invention. As shown in FIG. 4, an observer can use a GUI 120 on the VRD to not only observe streams from the CES 20, but also to control streams from the CES 20. For example, in an embodiment in which the logical digital video stream (media 25) is a processed real digital video stream, an observer may depress a Pan/Tilt/Zoom (PTZ) preset or Guard-Tour preset in the GUI 120, or click the up/down/right/left arrows on a PTZ control exposed in the GUI 120 to initiate a GUI command 105 that is transmitted from the GUI 120 to the VMS 50, using a VMS/VRD protocol. The VMS 50, in turn, converts the GUI command 105 into a camera control command 115. The conversion depends on the CES/VMS protocol. For example, if the CES 20 is emulating a market-leading camera, and the VMS 50 selected this camera at the IP address and port of the CES 20, a PTZ command 105 would be converted into an appropriate HTTP request camera control command 115 containing various parameters. As another example, instead of performing a conversion, the VMS 50 may encapsulate the GUI command 105 into a camera control command 115 in a protocol of the CES 20 that can be processed by the CES 20.

Upon receipt of the camera control command 115, the CES 20 converts the command 115 into one or more appropriate API commands 125. An API Control module 110 within the video processing system 80, in turn, converts the API commands 125 into specific commands 135*a* and 135*b* destined for one or more modules 100 in the video processing system 80 and into external API commands 135*c* that can be used, for example, to control the camera (not shown) via IP network 30. It should be understood that any GUI command 105 for any type of logical digital video stream can be converted/encapsulated and processed in the same manner as described above. In addition, in other embodiments, the API Control module 110 may not be necessary or only some subset of the functionality of the API Control module 110 might be included within the CES 20.

Figure 5:
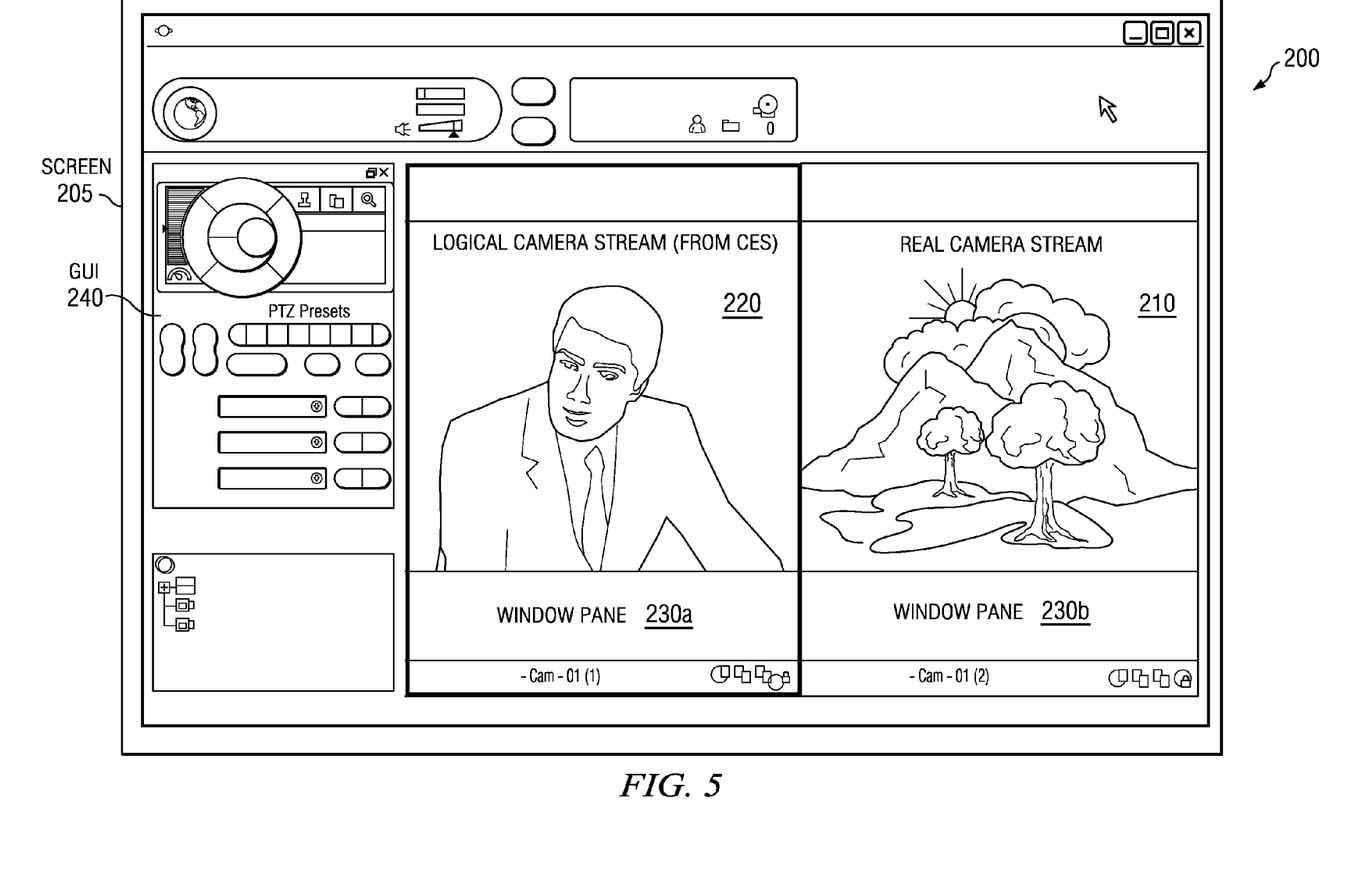
FIG. 5 illustrates an exemplary display device of a video receiving device, in accordance with embodiments of the present invention.

FIG. 5 illustrates an exemplary display device 200 of a video receiving device, in accordance with embodiments of the present invention. The display device 200 shown in FIG. 5 includes a single screen 205. However, in other embodiments, it should be understood that the display device 200 may include multiple screens 205. The screen 205 may display one or more real and/or logical digital video streams. As described above, to view a real digital video stream 210 and a logical digital video stream 220 simultaneously, the real/logical digital video streams 210/220 can be displayed in a tiled format configuration, such that each real/logical digital video stream 210/220 is displayed in a respective window pane 230*a*/230*b* on the screen 205.

The window panes 230*a*/230*b* may be separate, non-overlapping areas on a single screen 205, as shown in FIG. 5, and/or different screens on one or more display devices. The window panes 230*a*/230*b* may each have the same size and/or shape or different sizes/shapes. For example, an observer viewing a single screen 205 containing several tiled window panes can view physical cameras (real digital video streams 210) in some panes 230b, and logical cameras (logical digital video streams 220) in other panes 230a.

As shown in FIG. 5, an observer can view a real digital video stream 210 from a physical camera in window pane 230b and a logical digital video stream 220 from the CES in window pane 230a. The logical digital video stream 220 in window pane 230a may be, for example, a processed version of the real digital video stream 210 displayed in window pane 230b, a processed version of a different real digital video stream (from another camera), or any other available stream or tiled streams within the CES, either based on physical cameras or not. For example, window pane 23a on the screen 205 may show video corresponding to an animated PowerPoint™ presentation, a dynamic desktop or whiteboard screen share, a static or dynamic geographical map or a graphical user interface from an external application, such as an email/calendar/personal information manager application or other software application, accessed as a client by the CES.

In addition to the real/logical digital video streams, one or more graphical user interfaces (GUIs) 240 may further be provided in one or more window panes to enable an observer to control the real/logical digital video streams 210/220 and the display thereof in various window panes 230a/230b. For example, a single GUI 240 can be provided in a separate window pane to control some/all of the real/logical digital video streams. As another example, a respective GUI 240 for one or more real/logical digital video streams can be provided in a separate window pane and/or within the same window pane containing the real/logical digital video stream. In another embodiment, the GUI(s) 240 are provided in a separate area of the screen outside of the tiled area containing the window panes. In yet another embodiment, the GUI(s) 240 are provided on one or more different screens/display devices of the VRD.

In addition to controlling the streams currently within the panes 230a and 230b, the GUI can further enable the observer to select which stream appears in which pane. For example, depressing Preset-1 in the GUI may cause the CES to route Logical Stream-a to one of the window pane 230a, while depressing Preset-2 in the GUI may cause the CES to instead route Logical Stream-b to window pane 230b. As another example, depressing Preset-8 in the GUI may cause a tiled version of some number of multiple logical digital video streams, where the tiling is performed by the CES, to be routed as a single stream to window pane 230a.

In the example shown in FIG. 5, the logical digital video stream 220 is a multiparty video teleconference to which the CES is connected. The video teleconference may be for the purpose of discussing the real digital video stream 210 shown in window pane 230b. Therefore, the observer sees and hears each person in the video conference in the left window pane 230a, while continuing to observe the actual surveillance camera in the right window pane 230b. The observer may be only a passive participant in the video conference 220, so that the observer only sees and hears other participants, may operate a push-to-talk control exposed in the left window pane 230a in order to be heard (but not seen) by the other participants in the multiparty conference, or may also have a physical camera connected to the video teleconference, so that for example, when the observer depresses the push-to-talk control in the left window pane 230a, the observer is also seen by others in the teleconference.

Although this example illustrates only a two-pane tiling, it should be understood that any combination of real/logical digital video streams can be displayed in an N-pane tiled configuration.

Figure 6:
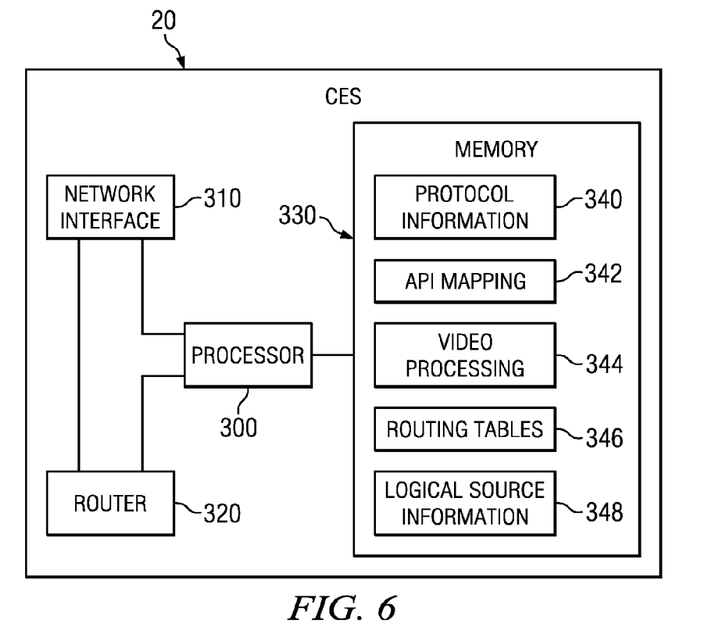
FIG. 6 is a block diagram illustrating various exemplary components of a camera emulation server for providing a logical digital video stream, in accordance with embodiments of the present invention.

FIG. 6 is a block diagram of an exemplary CES 20, in accordance with embodiments of the present invention. The CES 20 includes a processor 300, network interface 310, router 320 and memory 330. The network interface 310 is coupled to a packet-switched (IP) network to communicate with logical sources, remote video surveillance cameras and the VMS. Thus, as used herein, the term "network interface" refers to the point of interconnection between the CES 20 and a private or public packet-switched network. The network interface 310 is generally understood to be a network interface card (NIC), and the network interface 310 shown in FIG. 6 is understood to include one or more NIC's, each having its own separate IP address. However, in other embodiments, the CES 20 may have two or more IP addresses on the same single NIC, so that the CES 20 can straddle different networks with the same NIC using multi-homing.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), Digital Signal Processing chips, or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

The memory 330 maintains routing tables 346, and the processor 300 is further coupled to the memory 330 to use the routing tables 346 to route logical digital video streams to one or more VMSs and to route Session Setup requests and external API commands to logical sources and remote physical surveillance cameras via the router 320 and network interface 310.

The memory 330 further maintains logical source information 348 and protocol information 340. The logical source information 348 may include, for example, an address of a logical source or physical camera, and any other information associated with one or more logical sources and/or physical cameras. The protocol information 340 may include, for example, the protocols for communicating with each VMS, logical source and/or physical camera, IP address and port information for each logical digital video stream and information for performing any necessary protocol conversions. The IP address and port information can include, for example, the IP address and port of the CES, VMS and logical source/external camera for each logical digital video stream. The processor 300 is coupled to the memory 330 to use the logical source information 348 and protocol information 340 to communicate with one or more VMSs, logical sources and/or remote physical cameras via one or more IP addresses and/or ports.

Furthermore, the memory 330 maintains API mapping information 342 for mapping between camera control commands and API commands. In one embodiment, the API mapping information 342 is implemented using text-based look-up tables that are easily configurable. The processor 300 is coupled to the memory 330 to use the API mapping information 342 to map any camera control commands received from the VMS into appropriate internal/external API commands. For example, the processor 300 may be configured to suitably proxy relay/pan/tilt/zoom (PTZ) signals received from the VMS to physical cameras using the API mapping information 342.

The memory 330 may further include a video processing algorithm 344 executable by the processor 300. Examples of video processing algorithms 344 include, but are not limited to, contrast enhancement, background filtering, foreground filtering, megapixel camera zooming, tracking, multisensor fusion (multiple cameras sent to the same processing function), 3D processing, tiling, transcoding and other types of video processing. The processor 300 may execute the video processing algorithm 344 for one or more logical digital video streams.

Figure 7:
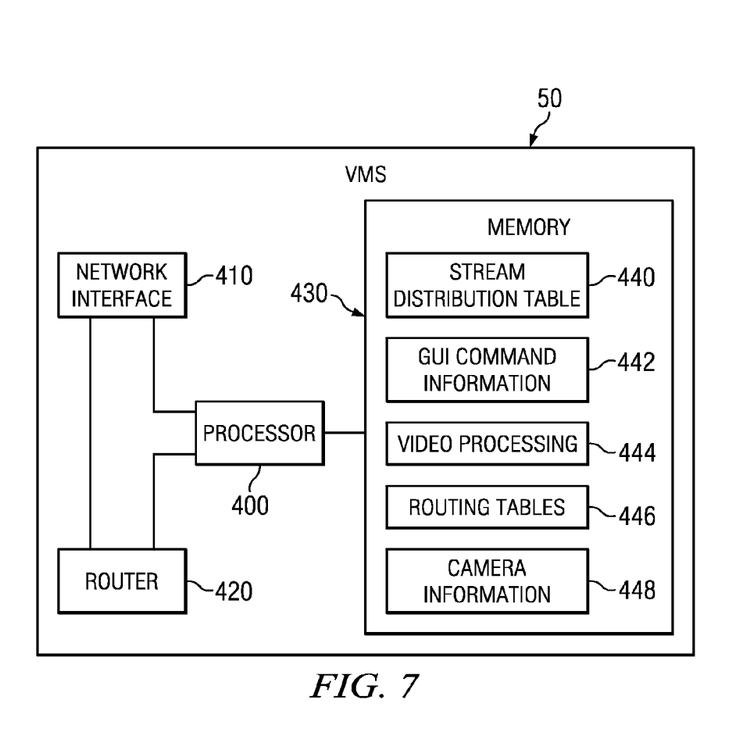
FIG. 7 is a block diagram illustrating various exemplary components of video management server for receiving and providing real and logical digital video streams, in accordance with embodiments of the present invention.

FIG. 7 is a block diagram of an exemplary VMS 50, in accordance with embodiments of the present invention. The VMS 50 includes a processor 400, network interface 410, router 420 and memory 430. The network interface 410 is coupled to a packet-switched (IP) network to communicate with video receiving devices (VRDs), remote video surveillance cameras and the CES.

The memory 430 maintains routing tables 446, and the processor 400 is further coupled to the memory 430 to use the routing tables 446 to route real/logical digital video streams to one or more VRDs and to route Session Setup requests and camera control commands to the CES and remote physical surveillance cameras via the router 420 and network interface 410. The memory 430 also maintains a distribution table 440, which may be part of the routing tables 446, mapping which real/logical digital video streams are currently being routed to which VRD's if a one-to-many distribution of a real/logical digital video stream is implemented. The distribution table 446 is updated by the processor 400 when new requests are received from VRD's or based on control input received via the network interface 410. The distribution table 440 may also be updated by the processor 400 when a VRD and/or camera goes off-line.

The memory 430 further maintains camera information 448, which includes, for example, an address for each physical/logical camera (i.e., the URL, IP address or other contact information for each physical/logical camera) and an indication of whether each physical/logical camera is on-line and currently transmitting digital video streams. The camera information 448 may also include physical/logical camera characteristics, physical/logical camera protocols (including IP address/port within the VMS and CES and any protocol conversion information to convert between CES/physical camera protocols and VRD protocols), and any other information associated with the physical/logical camera. The processor 400 is coupled to the memory 430 to use the camera information 448 to communicate with one or more VMS s, logical sources and/or remote physical cameras via one or more IP addresses and/or ports.

Furthermore, the memory 430 maintains GUI command information 442, and the processor is coupled to the memory 430 to use the GUI command information 442 to convert GUI commands received from VRDs into camera control commands for transmission to the CES or physical cameras. In one embodiment, the GUI command information 442 is implemented using text-based look-up tables that are easily configurable. In embodiments in which the GUI command is related to a logical digital video stream from a logical source other than a video surveillance camera, the GUI command information 442 may instruct the processor 400 to encapsulate the GUI command into an appropriate message (referred to generally as a camera control command) for transmission to the CES.

The memory 430 may further include a video processing algorithm 444 executable by the processor 400. Examples of video processing algorithms 444 include, but are not limited to, contrast enhancement, background filtering, foreground filtering, megapixel camera zooming, tracking, multisensor fusion (multiple cameras sent to the same processing function), 3D processing, transcoding and other types of video processing. The processor 400 may execute the video processing algorithm 444 for one or more real/logical digital video streams.

Figure 8:
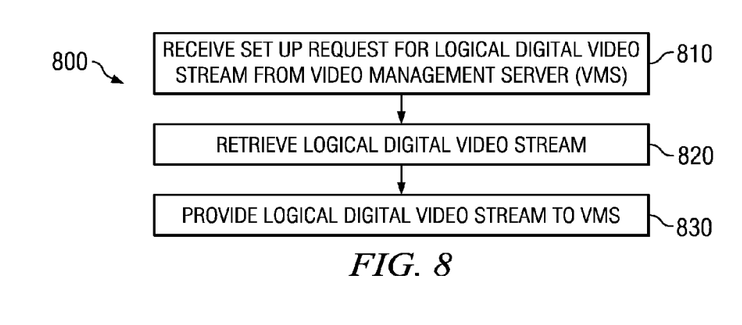
FIG. 8 illustrates an exemplary method for integrating real and logical digital video streams in a video surveillance system, in accordance with embodiments of the present invention.

FIG. 8 is a flowchart illustrating an exemplary process 800 for integrating real and logical digital video streams in a video surveillance system, in accordance with embodiments of the present invention. The process begins at block 810, where a request is received at a camera emulation server for a logical digital video stream to be sent to a video management server via a packet-switched network. The logical digital video stream includes data other than original video surveillance data from a physical video surveillance camera. For example, the logical digital video stream may include a processed version of a real digital video stream from a physical surveillance camera, a static/dynamic digital file, a graphical user interface of an external application, such as an email/calendar/personal information manager application or other software application, a web page of a website, a communication session (i.e., a voice conference, video conference, web conference, voice over Internet Protocol (VoIP) call, video call or instant messaging session), streaming media or a digital presentation including one or more of text, graphics, sound, animated objects and multimedia objects.

At block 820, the logical digital video stream is retrieved by the camera emulation server via the packet-switched network. For example, the camera emulation server can retrieve the real digital video stream from a remote video surveillance camera and perform any necessary processing to produce a processed digital video stream as the logical digital video stream. As another example, the camera emulation server can access a teleconference server providing voice and/or video teleconferencing, a web conference server providing web conferencing, a voice over IP (VoIP) server providing voice and/or video over IP, a web server providing web pages of a website, an instant message server providing instant messaging service, an email server providing email service, a remote sensor providing sensor data or a remote server/computer providing various media. Finally, at block 830, the logical digital video stream is provided from the camera emulation server to the video management server for routing to one or more video receiving devices for display thereon in combination with a real digital video stream including video surveillance data captured by a remote physical video surveillance camera in respective window panes configured in a tiled format on at least one display device of the video receiving device(s).

As will be recognized by those skilled in the art, the innovative concepts described in the present application can be modified, varied and adapted over a wide range of applications. Accordingly, the scope of the subject matter is not limited to any of the specific exemplary teachings discussed, but is instead defined by the following claims.

The invention claimed is:
1. A video surveillance system, comprising:
a camera emulation server including a processor for producing a logical digital video stream emulating a real video surveillance camera, the logical digital video stream including data other than original video surveillance data; and a video management server coupled to the camera emulation server via a packet-switched network to receive the logical digital video stream and further coupled to the packet-switched network to receive a real digital video stream including video surveillance data captured by a remote physical video surveillance camera, the video management server including a processor for providing the logical digital video stream and the real digital video stream to a video receiving device via the packet-switched network for simultaneous display in respective window panes configured in a tiled format on at least one display device of the video receiving device.

2. The video surveillance system of claim 1, wherein the video management server further provides a graphical user interface to the video receiving device to enable a user to control the logical digital video stream and the real digital video stream.

3. The video surveillance system of claim 2, wherein the graphical user interface enables the user to enter a camera control command on the video receiving device that is provided to the camera emulation server via the video management server, the camera emulation server mapping the camera control command to an application program interface (API) command for the logical digital video stream.

4. The video surveillance system of claim 2, wherein the graphical user interface enables the user to perform one or more of: change at least one of the logical digital video stream and the real digital video stream to a new logical digital video stream or a new real digital video stream, move at least one of the logical digital video stream and the real digital video stream to another pane on the screen, receive and display one or more additional logical digital video streams in one or more additional panes on the screen, receive and display one or more additional real digital video streams in the one or more additional panes on the screen, manipulate viewing of at least one of the logical digital video stream and the real digital video stream, interact with at least one of the logical digital video stream and the real digital video stream, control audio on at least one of the logical digital video stream and the real digital video stream, control the remote physical video surveillance camera and remove at least one of the logical digital video stream or the real digital video stream.

5. The video surveillance system of claim 1, wherein the logical digital video stream includes one or more of a processed digital video stream of an additional remote physical video surveillance camera, a static digital file, a dynamic digital file, a graphical user interface of an external application, a web page of a website, a communication session, streaming media and a digital presentation including one or more of text, graphics, sound, animated objects and multimedia objects.

6. The video surveillance system of claim 5, wherein the processed digital video stream includes an overlay added to an additional real digital video stream, the overlay including one or more of text and graphics.

7. The video surveillance system of claim 5, wherein the communication session is a voice conference, video conference, web conference, voice over Internet Protocol (VoIP) call, video call, or instant messaging session.

8. The video surveillance system of claim 1, wherein the video management server receives the real digital video stream via the camera emulation server.

9. The video surveillance system of claim 1, wherein the camera emulation server emulates a protocol of an IP video surveillance camera to communicate with the video management server.

10. The video surveillance system of claim 1, wherein the camera emulation server communicates with the video management server using a specific protocol defined by the video management server, a standard protocol or a generic protocol.

11. The video surveillance system of claim 1, wherein the camera emulation server further emulates a video encoder to provide multiple logical digital video streams from a single IP address and port to the video management server.

12. The video surveillance system of claim 1, wherein the camera emulation server further includes at least one of multiple IP addresses and multiple ports to provide multiple logical digital video streams to the video management server.

13. The video surveillance system of claim 1, wherein the video management server further provides at least one of the logical digital video stream and the real digital video stream to at least one additional video receiving device.

14. The video surveillance system of claim 1, further including:
a video processing system including the camera emulation server and one or more chains of pipelined modules coupled to the camera emulation server, the one or more chains of pipelined modules enabling the camera emulation server to provide the logical digital video stream to the video management server.

15. A camera emulation server, comprising:
a network interface coupled to a packet-based network; and
a processor for producing a logical digital video stream emulating a real video surveillance camera, the logical digital video stream including data other than original video surveillance data;
wherein the processor transmits the logical digital video stream to a video management server via the network interface for routing of the logical digital video stream to a video receiving device for display thereon in combination with a real digital video stream including video surveillance data captured by a remote physical video surveillance camera in respective window panes configured in a tiled format on at least one display device of the video receiving device.

16. The camera emulation server of claim 15, wherein the processor further receives via the network interface a camera control command from the video receiving device via the video management server, the processor mapping the camera control command to an application program interface (API) command for the logical digital video stream.

17. The camera emulation server of claim 15, wherein the logical digital video stream includes one or more of a processed digital video stream of an additional remote physical video surveillance camera, a static digital file, a dynamic digital file, a graphical user interface of an external application, a web page of a website, a communication session, streaming media and a digital presentation including one or more of text, graphics, sound, animated objects and multimedia objects.

18. The camera emulation server of claim 15, wherein the processor further receives the real digital video stream and provides the real digital video stream to the video management server via the network interface.

19. The camera emulation server of claim 15, wherein the processor emulates a protocol of an actual IP video camera to communicate with the video management server or communicates with the video management server using a specific protocol defined by the video management server, a standard protocol or a generic protocol.

20. The camera emulation server of claim 15, wherein the processor further emulates a video encoder to provide multiple logical digital video streams from a single IP address and port to the video management server or provides at least one of multiple IP addresses and multiple ports to provide the multiple logical digital video streams to the video management server.

* * * * *